Patented Apr. 21, 1931

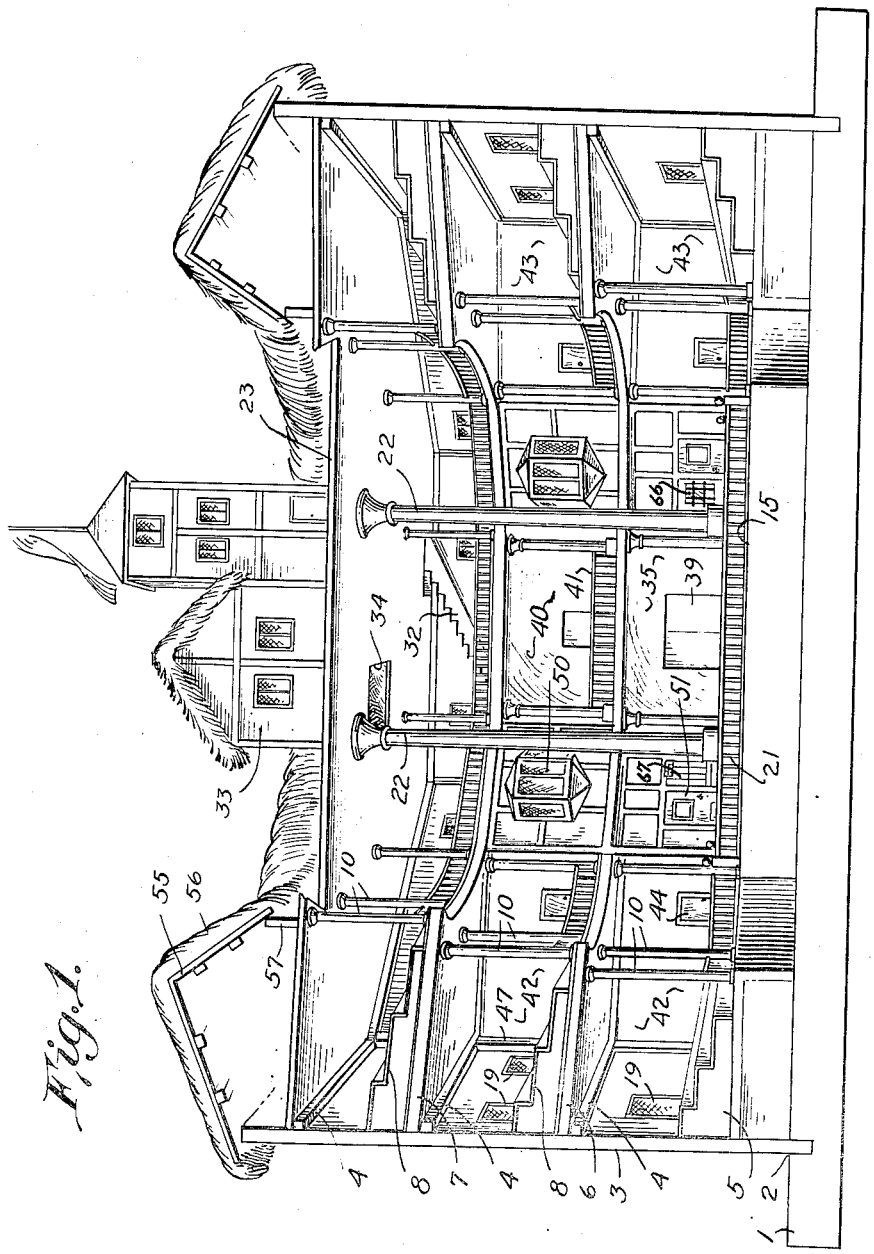

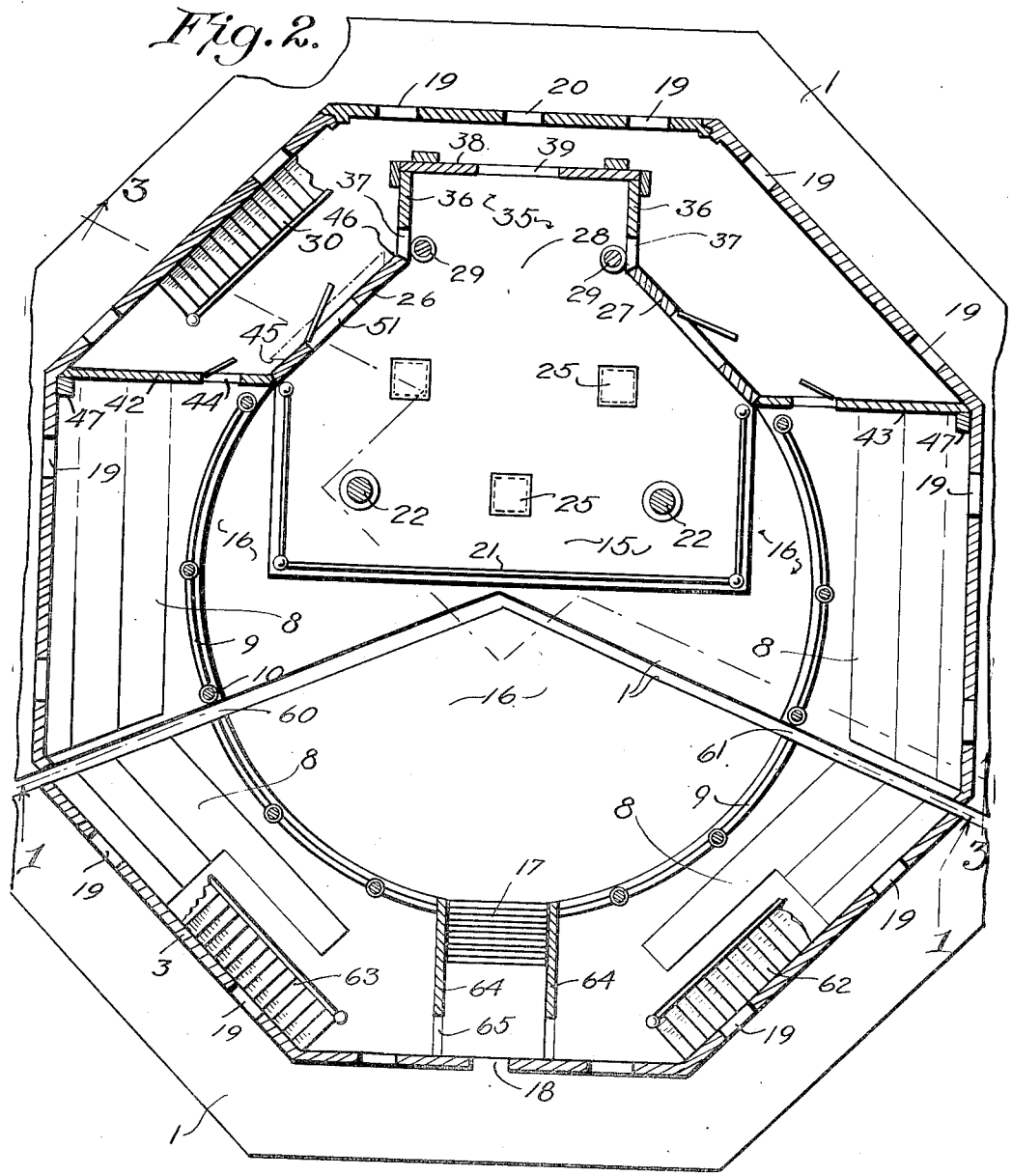

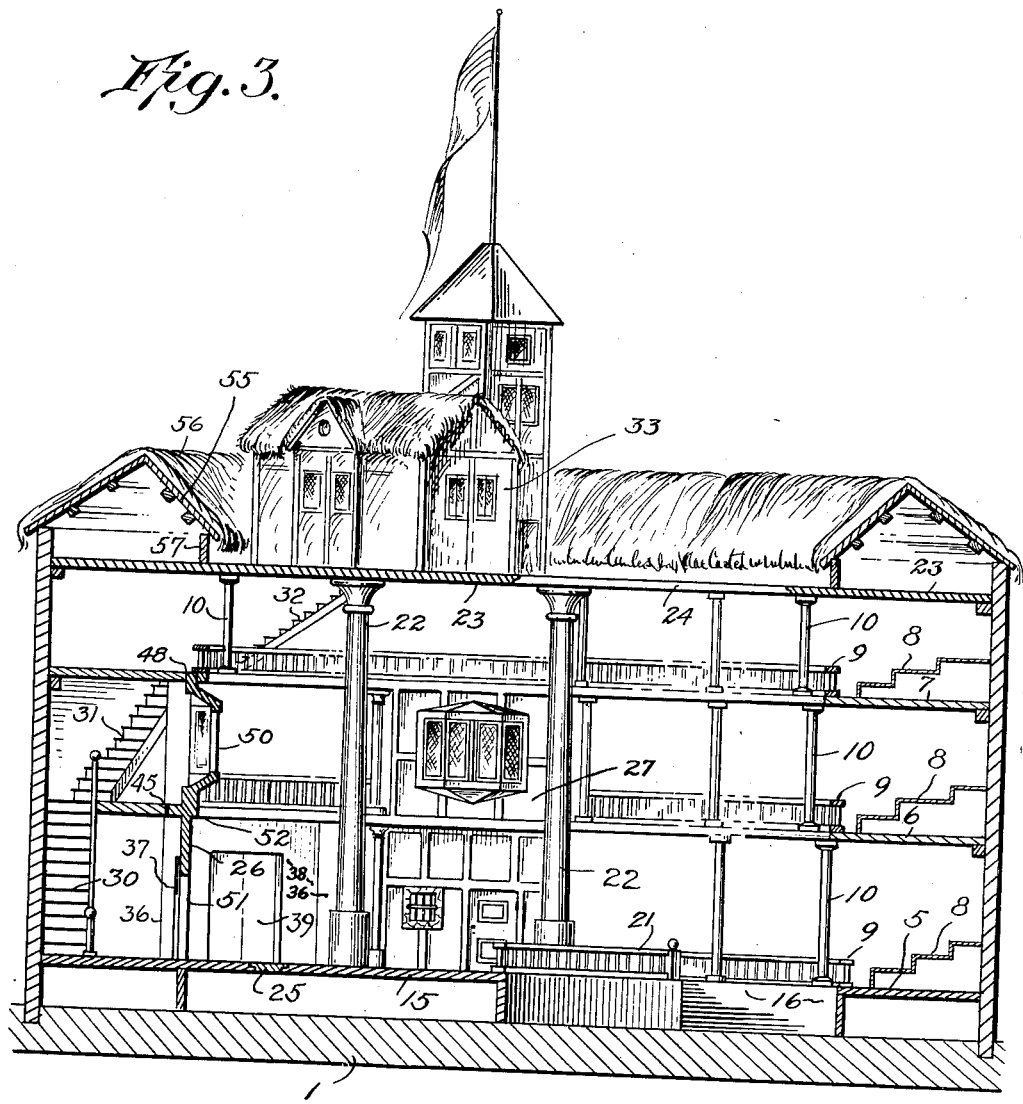

1,801,724

UNITED STATES PATENT OFFICE

HENRY E. CONKLIN, OF AUSTIN, TEXAS

EDUCATIONAL APPLIANCE

Application filed December 11, 1929. Serial No. 413,298.

This invention relates to educational appliances and more particularly to models, having for its object to provide a construction simple in parts, and more illustrative of the matter portrayed than those heretofore proposed.

With these and other objects in view the invention resides in the novel details of construction and combinations of parts more fully hereinafter disclosed and particularly pointed out in the claims.

Referring to the accompanying drawings forming a part of this specification in which like numerals designate like parts in all the views,—

Fig. 1 is a vertical elevational view of the major portion of the model, said view showing the interior construction and taken as on the line 1—1 of Fig. 2 looking in the direction of the arrows;

Fig. 2 is a horizontal sectional view of the model; and

Fig. 3 is a vertical sectional view of the model taken as on the line 3—3 of Fig. 2 and looking in the direction of the arrows, to better illustrate certain details of construction.

In the past twenty-five years it is noticeable that able investigators of, and commentators on, the English drama of the reign of Elizabeth show increasing concern about the dramaturgy of the period and the nature of the stage and playhouse, as evidenced by several prominent educators. This invention is the result of much study and reference to what has heretofore been considered and constitutes an appliance of high educational value in that it is believed to portray the Globe Playhouse, the house for which all but a possible half dozen of the thirty-seven plays of Shakespeare were written, together with many other plays of other dramatists, e. g., Beaumont and Fletcher.

Ten years of teaching in college and university of courses involving the reading and study of Shakespearean plays convince me that the great majority of students in this country have but vague, indefinite and for the most part incorrect notions of the nature of an Elizabethan stage or playhouse. Even those who have witnessed current modern productions of plays of the period have little concept of the distinction that must be drawn in, say, the playing in the first quarter of the seventeenth century of Macbeth, act II scene III and the rendition thereof by present day players. That is to say during this lapse of time there have resulted many differences in playing conditions (and consequently in reading of texts and stage directions) due to the development and adoption of the current "picture" or "proscenium" stage over the Elizabethan "apron" stage. Few persons nowadays realize thoroughly that change of scene then meant a change of location on the stage, moving the action from one part to another, rather than the lifting and dropping of a front curtain. No stage nowadays has a roof, painted like the sky, supported by large pillars resting on the middle of the platform. No one nowadays sits upon the stage to see the show, as then they did. No one now attends a play in a house the center of which is open to the sky.

In this appliance it is believed there can be found represented in their order, proportionate size and position every element thought to have been present in the Globe Playhouse. An actual construction of this appliance has been favorably regarded by two eminent American students of Elizabethan drama of professorial rank in prominent American universities; it has been very successfully used in university classes; it has been pronounced illuminating by a nationally known American player of Shakespearean parts; therefore its educational value cannot be disputed. It is built to the scale three-eighths of an inch equals one foot and is therefore capable of being handled readily and is not so large as to be cumbersome nor so small that the interior parts cannot be manipulated. It is designed to be built entirely of flat parts, without hinges, pins, bolts or other mechanical devices, with the exception of clips which slip over the upper edges of the eight sides and hold the upper ends of the joints of those sides. The separable parts are fitted together by means of cleats and grooves only, except for the upper corners mentioned, and the entire structure is maintained in position by these cleats, etc. Any smallest attachment of the entire model may be removed and replaced, by simple motions, without tools or special appliances.

Referring particularly to the drawings there is shown a base member 1 preferably made in two pieces each of which is provided with suitable grooves 2 into which are stepped the lower extremities of the sides 3 of the building, there being shown eight of these sides five of which are supported by one of the base members, the other three being supported by the other of the base members. The reason for this is to enable a division of the building as indicated in Fig. 2 whereby, when the forward or front portion containing the three sides is moved away from the rest of the building, the interior structure will become readily visible. The sides of the building are preferably secured together by clips at their upper extremities at the joint between two adjacent sides, said clips not being illustrated as non-essential to the invention but being of such character that they may be readily attached or detached, thus enabling the disassembly of the appliance which may then be packed in substantially flat shape and carried from one place to another.

Each of the sides 3 is provided with cleats such as 4 of sufficient size only to support the outer peripheral edge portion of the several galleries and ceiling. In this connection the appliance is supplied with a lower floor 5, a first balcony 6, and an upper balcony 7 each of which is provided with a tiered platform such as 8 representative of the support for the chairs for the spectators. Each of the members 5, 6 and 7 is made substantially circular in form as shown in Fig. 2 whereby there is provided a large central open space extending from the base member 1 upwardly to the ceiling or heavens such as 23. Railings 9 and spaced pillars 10 are disposed along the inner peripheral edges of these members, the pillars supporting the balcony or ceiling thereabove, see Fig. 1. It is to be particularly observed that the first balcony 6 extends beyond the lower floor 5, and that the second balcony 7 extends beyond the first balcony 6 and the inner peripheral edge of the balconies is circular instead of being formed parallel with the outer side walls 3 of the building.

More particularly referring to Fig. 2 the stage 15, of the apron type, extends inwardly toward the center of the building, and in fact its front edge lies in a central vertical plane thereof. The stage is rectangular and on substantially the same elevation with the main floor 5 above described, but both the main floor and the stage are elevated above the ground floor represented by the base member 1 thus creating the pit 16 which is of approximately semi-circular shape. Access to the pit is obtained by a flight of steps 17 extending from the main floor 5 which latter is reached from the exterior of the building through the main entrance door 18. 19 are windows placed at various and appropriate locations in the side walls 3 of the building and 20 is an exit from the building located behind the stage. A railing 21 extends around the edge of the apron stage 15 and near the two outer corners of said stage are disposed heavy pillars or columns 22 extending to and supporting the ceiling or heavens 23. With particular reference to Figs. 1 and 3 it will be observed that the heavens include an outer ceiling or protecting cover over the balconies and a central portion extending only over the stage, thus leaving a semi-circular opening 24 through which the true heavens could be viewed.

The apron stage is provided with a plurality of trap doors 25, as well as vertical partitions 26 and 27 disposed to the rear and on either side thereof leaving an opening or passageway 28 therebetween through which the actors enter and leave the apron stage. Supporting columns such as 29 are located at the extremity of said partitions next said passageway. In other words, the passageway 28 connects the apron stage with the rearmost portion of the building from which the actors gain the apron, and curtains, not illustrated but understood, are provided for this opening. Stairways 30 and 31 connect the various floors of the building backstage while the stairway 32 is provided to reach the hutch 33 which is the building disposed upon the structure 23 called the ceiling or heavens. The hutch, preferably preformed because of its relative small size, is fitted in place over extensions or cleats secured to the upper surface of the heavens, and is provided with a gable and a tower the latter supporting a flagpole as clearly indicated in the drawings. The hutch may contain suitable appurtenances to the stage such as small pieces of scenery, chairs, etc. as well as a small winch, not shown, by means of which a "throne" chair may be lowered through the hatchway 34 in the heavens to the stage proper.

The opening 28 above described connects the apron and inner stages, the latter being that portion 35 of the stage disposed under the first balcony and centrally of the apron 15. The inner stage has side walls such as 36, each provided with a door such as 37 through which the actors gained said stage from the wings, and a rear wall 38 provided with a double door 39. The members 36 and 38 are secured in place as shown in Fig. 2 through the use of cleats and an interlocking of one edge of each side wall and its associated balcony partition as indicated at 46. Immediately above the inner stage 35 and between the first and second balconies is the balcony stage 40 with a railing 41 at its front edge, columns for supporting the floor above, side and rear walls similar to the corresponding parts 36 and 38, and curtains not shown but understood. The space between the main floor and the second balcony and behind the vertical partitions 26 and 27 is separated from the rest of the theater or auditorium by partitions such as 42 and 43 extending inwardly toward the apron stage from the outer walls of the building, see Fig. 2, each partition being provided with a door such as 44 adapted to close a passageway between the auditorium and the space reserved for the players. These partitions have their outer vertical edges secured in place by the vertical cleats 47 disposed on the outer walls 3, and their inner vertical edges held in place by the stage balcony partitions or walls 26 and 27 which, in turn, are preferably secured by sliding engagement with dove-tail grooves or slots formed in the inner edge of the balcony floor sections, as respectively shown at 45 and 48. The balcony partitions 26 and 27 are made in one piece, each provided with a bay-window indicated at 50 in the first balcony level and with a door such as 51 on the main stage level, the upper or balcony portion of said partition being offset from the plane of the lower or main floor portion as indicated at 52 in Fig. 3 and the faces of said partitions being suitably decorated in accordance with the Elizabethan style of architecture thus representing the outer faces of a house or building.

The roof of the building comprises a gable construction 55 provided with a covering 56 imitating thatch, said gable being supported by the outer wall sections 3 and short vertical wall portions 57 extending upwardly from the ceiling or heavens 23. The roof is substantially octagonal in shape, being a succession of gables, one for each outer wall 3, and entirely surrounds the hutch 33 and the heavens 23, when the model is assembled. It will be understood, however, that the roof is made in two units, one associated with the major portion of the model and the other associated with the smaller portion of said model, the ends of the roof units lying in the vertical planes of the joints 60 and 61 between said model portions. As above stated the purpose of building the model in two portions is to permit a full interior view of the device when the portions are separated. The roof portions are made separable from the wall and ceiling structure, the hutch merely rests upon the heavens, and the heavens and the balconies, as well as the floor, are readily separable from the wall sections and from each other, columns 10, 22 and 29 having pins in their ends which fit suitable sockets in the heavens, the balconies and the main floor sections, whereby the entire structure may be disassembled and conveniently packed with the base supports 1 for ready transportation.

It is to be observed that the main floor 5 as well as the first and second balcony floors 6 and 7 are each continuous between the joints 60 and 61 between the two portions of the model. Referring particularly to Fig. 2 it will be seen that main floor 5 extends not only from the joint 60 around to the other joint 61 but has integrally formed therewith the apron and inner stages 15 and 35 respectively. Further the balconies 6 and 7 by unitarily extending from the joint 60 to the joint 61 make the vertical partitions 42 and 43 intercostal. While the stairs 30, 31 and 32 are primarily for the use of the actors and stage hands, stairways such as 62 and 63 are provided near the entrance for the use of the audience between the main floor and a balcony. This main entrance 18 is flanked by partitions such as 64 between the main floor and the first balcony, each partition having a door such as 65 by which entrants were admitted to the floor and balcony seat sections. Each bay-window 50 is made with extending flanges, insertable through suitable slits in the balcony partitions 26 and 27, which may be bent to secure said bays in place, and the windows of each bay are provided with pins serving as hinges and either mica, celophane or other material in imitation of glass. The doors such as 51 are also made movable, and disposed to one side of each door is the representation of some opening having a part in some play, such for example as the barred prison window 66 and the wooden shutter 67 both of which are separable from their partitions and held thereto by means similar to those employed with respect to the bay-windows.

It is obvious that those skilled in the art may vary the details of construction as well as arrangements of parts without departing from the spirit of the invention, and therefore it is not desired to be limited to the foregoing except as may be required by the claims.

What is claimed is:—

1. A theater of polygonal shape consisting of a plurality of parts, one part containing the stage, the other part containing a gallery, the line of division between said parts being along diagonals of the theater.

2. A theater of polygonal shape consisting of a plurality of parts, one part containing the stage, the other part containing a gallery, the line of division between said parts being in vertical planes along diagonals of the theater.

3. A miniature theater of polygonal shape consisting of two parts, one part containing the stage and a portion of the gallery, the other part containing another portion of the gallery, a line of division between said parts being along a diagonal of the theater.

4. A miniature theater of polygonal shape consisting of two parts, one part containing the stage and a portion of the gallery, the other part containing the rest of the gallery, a line of division between said parts being along a diagonal of the theater.

5. A miniature theater of polygonal shape consisting of two parts, one part containing the stage and a portion of the gallery, the stage separated from the backstage space by a partition in prolongation of the gallery edge, the other part containing the rest of the gallery, a line of division between said parts being along a diagonal of the theater.

6. A miniature theater of polygonal shape consisting of two parts, one part containing the stage and a portion of the gallery, the stage separated from the backstage space by a partition extending from the stage floor to the uppermost gallery, the other part containing the rest of the gallery, a line of division between said parts being along a diagonal of the theater.

7. A miniature theater of polygonal shape consisting of two parts, one part containing the stage and a portion of the gallery, the stage separated from the backstage space by a partition interlocking with a gallery floor, the other part containing the rest of the gallery, a line of division between said parts being along a diagonal of the theater.

8. A miniature theater of polygonal shape consisting of two parts, one part containing the stage and a portion of the gallery, the stage separated from the backstage space by a partition, said partition interlockingly engaging grooves formed in a gallery floor, the other part containing the rest of the gallery, a line of division between said parts being along a diagonal of the theater.

9. A theater including a gallery, an apron stage, an inner stage, and a balcony partition disposed between the gallery and the inner stage and separating the apron stage from the space backstage, said partition interlockingly engaging a gallery floor.

10. A theater including a gallery encircling said theater, an apron stage, an inner stage under a portion of said gallery, and a balcony partition adjacent said apron and inner stages and interlockingly engaging the gallery floor.

In testimony whereof I affix my signature.

HENRY E. CONKLIN.